United States Patent
Mochizuki

(10) Patent No.: US 7,313,768 B2
(45) Date of Patent: Dec. 25, 2007

(54) REGISTER FILE AND METHOD FOR DESIGNING A REGISTER FILE

(75) Inventor: Akira Mochizuki, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 464 days.

(21) Appl. No.: 10/658,202

(22) Filed: Sep. 10, 2003

(65) Prior Publication Data

US 2004/0060015 A1    Mar. 25, 2004

(30) Foreign Application Priority Data

Sep. 11, 2002   (JP)   ............................. 2002-265521

(51) Int. Cl.
 *G06F 17/50* (2006.01)
(52) U.S. Cl. .......................................... 716/1; 716/17
(58) Field of Classification Search .................... 716/1, 716/3, 17; 365/230.05, 49
 See application file for complete search history.

(56) References Cited

U.S. PATENT DOCUMENTS

| | | | | |
|---|---|---|---|---|
| 5,657,291 | A * | 8/1997 | Podlesny et al. | 365/230.05 |
| 5,815,023 | A | 9/1998 | Webber et al. | |
| 6,219,756 | B1 * | 4/2001 | Kasamizugami | 711/127 |
| 6,320,813 | B1 * | 11/2001 | Kant | 365/230.06 |
| 6,556,501 | B1 * | 4/2003 | Naffziger | 365/230.05 |
| 6,594,714 | B1 * | 7/2003 | Swanson et al. | 710/51 |
| 6,654,870 | B1 * | 11/2003 | Barry et al. | 712/24 |
| 6,766,433 | B2 * | 7/2004 | Circello et al. | 711/202 |
| 6,826,110 | B2 * | 11/2004 | Dhong et al. | 365/230.05 |
| 6,831,850 | B2 * | 12/2004 | Pereira et al. | 365/49 |

FOREIGN PATENT DOCUMENTS

| | | |
|---|---|---|
| JP | 59-106021 | 6/1984 |
| JP | 2-277125 | 11/1990 |
| JP | 5-206791 | 8/1993 |
| JP | 7-38398 | 2/1995 |
| JP | 7-262003 | 10/1995 |
| JP | 10-275075 | 10/1998 |
| SU | 1128253 A | 12/1984 |

OTHER PUBLICATIONS

J. L. Hennessy et al., "Computer Organization & Design," 1996, (translated by Mitsuaki Narita); ISBN 4-8222-8002-0, pp. 678-680, Nikkei BP Corp.
John L. Hennessy, B.5 Memory Elements, Computer Organization and Design 2$^{nd}$ Edition (vol. 2), Japan, Nikkei Business Publications, Inc., Hisashi Okamura, May 17, 1999, 2$^{nd}$ Edition, pp. 799-804.
Japanese Office Action dated Oct. 1, 2007, Japanese Patent Office, Application No. 2002-265521.

* cited by examiner

*Primary Examiner*—Jack Chiang
*Assistant Examiner*—Binh Tat
(74) *Attorney, Agent, or Firm*—Foley & Lardner LLP

(57) ABSTRACT

A register file includes a plurality of registers for storing therein data, a plurality of input ports for receiving therethrough the data to be stored in the registers, and a plurality of output ports for delivering therethrough the data stored in the registers. Each register includes an input port selector for selecting one of the write ports through which data is received. The register file also includes a read data selector block for specifying which data stored in the registers is to be read through one of the output ports. The output port selector is implemented by a combinational circuit which saves power dissipation of the register file.

4 Claims, 8 Drawing Sheets

```
assign Y = Q0 & ~S[1] & ~S[0] |
           Q1 & ~S[1] &  S[0] |
           Q2 &  S[1] & ~S[0] |
           Q3 &  S[1] &  S[0] ;
```

FIG. 8
```
case (S)
   2'b00:Y = Q0
   2'b01:Y = Q1
   2'b10:Y = Q2
   2'b11:Y = Q3
endcase
```
FIG. 9
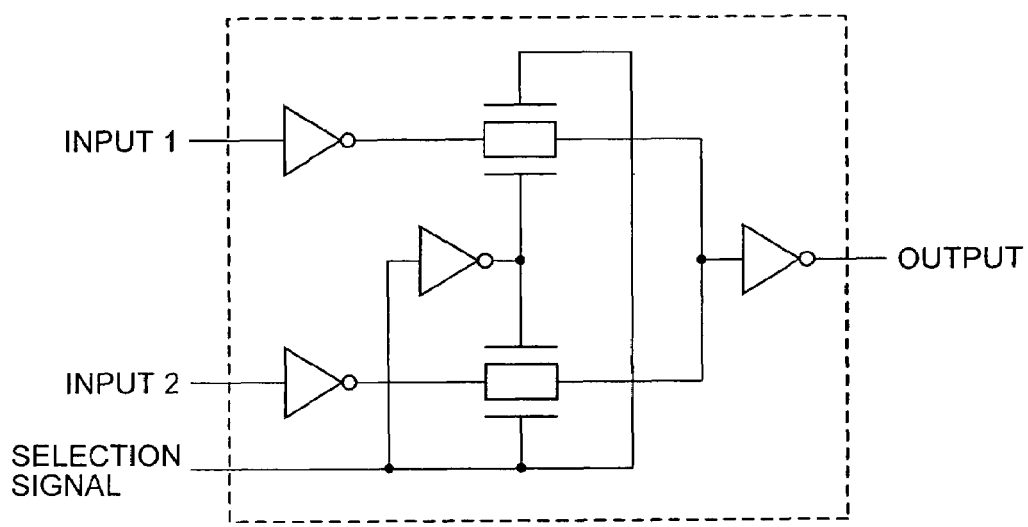
FIG. 10
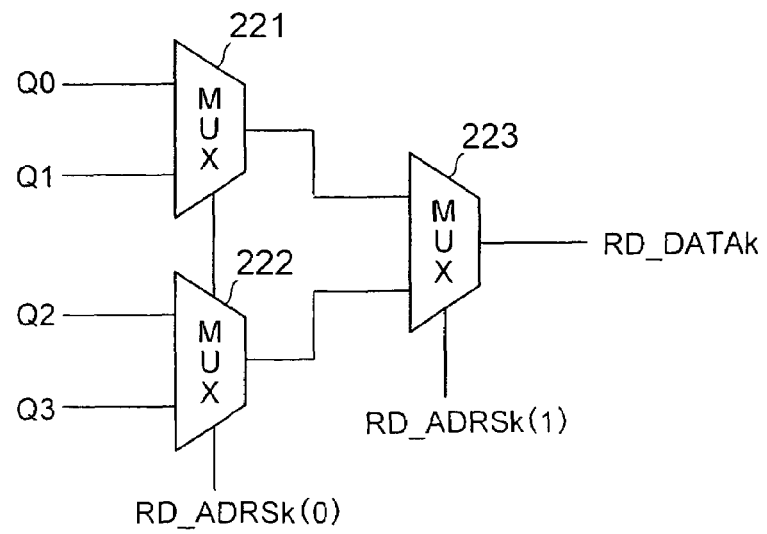

REGISTER FILE AND METHOD FOR DESIGNING A REGISTER FILE

BACKGROUND OF THE INVENTION (a) Field of the Invention

The present invention relates to a register file and a method for designing a register file and, more particularly, to a technique for designing a register file by using a cell base designing technique.

(b) Description of the Related Art

In general, deign for semiconductor devices, such as an ASIC (application-specific IC) or LSI, employs a cell base design technique, wherein a cell library is used which stores therein a large number of designed circuits in the form of modules. The designed circuits of the cell library, which are generally called hardware cells, have different scales and include small-size basic logic circuits such as AND gate, OR gate and flip-flop, medium-size circuit blocks such as ALU (arithmetic logic unit) and adder, and large-size circuits blocks (macro blocks) such as CPU and RAM. Each semiconductor device is designed by combining these hardware cells in the cell base designing technique, which can reduce the time length needed for the design of the semiconductor device and verification of the design accuracy.

For example, in the design of a semiconductor device having therein a built-in processor, the designer selects one of processor cores from the cell library in consideration of the circuit scale and throughput thereof. Each processor core in the cell library is designed by a dedicated design sector to have an optimum basic architecture and provided to the cell library in the form that allows easy installation in semiconductor devices. The designer of semiconductor devices installs the selected processor core in a desired semiconductor device while providing thereto peripheral resources required of the desired semiconductor device. By determining the peripheral resources depending on desired semiconductor devices, a single processor core having a basic architecture can be installed in a variety of semiconductor devices as processors having different peripheral resources.

FIG. 7 exemplifies architecture of a register file, which constitutes a part of a semiconductor device designed by using a conventional design technique. The register file includes a plurality of registers and has functions of writing data in a specified register and reading data from a specified register. Such a register file is described in a literature entitled "Computer Organization & Design" published from Nikkei BP corp., translated by Mitsuaki Narita from the original literature written by John L Hennessy and David A Patterson, 1996 ISBN 4-8222-8002-0, p678-p680.

In the example shown in FIG. 7, the register file 200 includes therein 4-bit registers Fi (i=0 to 3), a selection signal generator 210, an output port selector 220, four write ports WR_DATAj (j=0 to 3), and four read ports RD_DATAk (k=0 to 3).

The selection signal generator 210 includes therein four decoders DECj each corresponding to one of the write ports WR_DATAj, four AND gates ANDj and an OR gate OR. Each decoder DECj decodes a corresponding 2-bit write address signal WR_ADRS j to generate a 4-bit signal. Each AND gate ANDj calculates a logical product of the decoded 4-bit signal and a write enable signal WR_ENj delivered from a processor core (not shown) to deliver the logical product as a selection signal to the register Fi. The OR gate OR calculates a logical sum of the outputs from the AND gates ANDj to deliver the same as an activating signal αi to one of the registers Fi selected by one of the write address signals WR_ADSRj.

The output port selector 220 includes therein four multiplexers MUX corresponding to the output ports RD_DATAk, wherein each of the multiplexers MUX receives any of the data Qi stored in the registers Fi to converts the same as 4-bit data. Each multiplexer MUX selects one of the data Qi to be read out through the read ports RD_DATAk based on a 2-bit read address signal RD_ADRSk.

Each register Fi includes therein an input port selector 230 and a data storage 240. The input port selector 230 includes therein three multiplexers 231 to 233, and acts as a selector having an priority order specified among the input port selectors of the registers. The input port selector 230 selects one of the write ports WR_DATAJ to be connected to the data storage 240 based on the selection signal from the selection signal generator 210. If a plurality of write addresses WR_ADRSj concurrently specify the same register Fi, then the input port selector 230 selects the write address WR_ADRSj supplied through the write address port having a highest priority order, i.e., a lowest sequential number. In addition, if the write address WR_ADRSj does not specify any of the write ports WR_DATAj, then the input port selector 230 selects the data supplied through the write port WR_DATAJ having a highest or lowest priority order.

The data storage 240 includes therein a memory 241 and a clock gate 242. The memory 241 includes therein synchronous D-type flip-flops (D-FF) in number corresponding to the number of bits of the data to be stored. Each D-FF stores therein a 4-bit data, received through one of the write ports WR_DATAj, in synchrony with the clock signal CLK in a bit-by-bit basis. The clock gate 242 generates a logical product of the clock signal CLK and activating signal αi. Since the write port WR_DATAj is connected to an external data line or bus (not shown), the data from the external data line is delivered to the data input "D" of the D-FF of each register Fi, even if the corresponding register Fi is not specified for receipt of data. In this case, the clock gate 242 delivers a low-level inactivating signal to the clock inputs "C" of the registers Fi which are not specified to receive the data. Thus, the data stored in the memories 241 of these files are not updated by the received data.

Hereinafter, the design for the multiplexers in the output port selector 220 will be described with reference to FIGS. 8 to 10. FIGS. 8 to 10 exemplify the design description of the multiplexer in the output port selector 220 during the cell base design, the circuit configuration of a 2-input/1-output multiplexer stored in the cell library with a gate level notation, and the configuration of the 4-input/1-output multiplexer obtained by the cell base design, respectively. The multiplexer shown in FIG. 9 is selected from the cell library as a primitive cell based on the design description.

In general, the cell base design technique is such that the function of a circuit block is described in a hardware description language (HDL), and the resultant description is used for logical synthesis to obtain a circuit configuration of combined primitive cells in a gate level notation.

For designing the semiconductor device shown in FIG. 7, each multiplexer MUX of the output port selector 220 is described in a case sentence such as shown in FIG. 8. The cell library stores therein a large number of primitive cells in a gate level notation, the primitive cells including a 2-input/1-output multiplexer such as shown in FIG. 9. Thus, the function shown in FIG. 8 can be implemented by combining the 2-input/1-output multiplexers retrieved from the cell library to configure a 4-input/1-output multiplexer such as shown in FIG. 10. The multiplexer shown in FIG. 10 includes three multiplexers 221 to 223 each having a configuration shown in FIG. 9, and is installed in the; semiconductor device to be designed. It is to be noted that each multiplexer of the 4-input/1-output multiplexer shown in FIG. 10 may have a circuit configuration different from the circuit configuration shown in FIG. 9 depending on the tool for the logical synthesis and cell library used for the design.

There is a possibility that the circuit in the gate level notation obtained by the cell base design technique does not necessarily provide an optimum configuration for the desired semiconductor device because the designer obtains the circuit configuration by using the tool for the logical synthesis. For example, if the multiplexer in the output port selector 220 is designed by logical synthesis while combining together the multiplexers each having a gate level configuration shown in FIG. 9 to have the circuit configuration shown in FIG. 10, the resultant multiplexer does not necessarily provide a lower operating current depending on the data Qi stored in each register Fi, as detailed hereinafter.

It is assumed herein that the zero-th bits of the data Q0 to Q3 stored in the registers F0 to F3 are (0,1,0,1) as viewed from Q0 to Q3, and that the read address RD_ADRSO is (00). The first-stage multiplexers 221 and 222 in FIG. 10 select and deliver data Q0 and Q2, respectively, based on the least significant bit "0" of the read address RD_ADRS0. The second-stage multiplexer 223 selects and delivers data Q0, or "0", based on the most significant bit "0" of the read address.

After the read address RD_ADRS0 shifts from (00) to (11), both the first-stage multiplexers 221 and 222 select and deliver data Q1 and Q3, respectively, and the second-stage multiplexer 223 selects and delivers data Q3, or "1". It is to be noted that the multiplexer 222, the output of which is not selected by the second-stage multiplexer 223, also operates to shift the output thereof from "0" to "1" in this example. In view that each multiplexer dissipates operating current when the output of the multiplexer shifts from "0" to "1", the multiplexer shown in FIG. 10 wastes the current due to the output shift of the unselected multiplexer 222.

FIG. 11 shows the configuration of a synchronous D-FF employed in the memory 241 in the register Fi. D-FF is of a master slave type, and thus includes a master latch 243 and a slave latch 244. The D-FF stores therein the data input through the data input "D" thereof in synchrony with the rising edge of the clock signal CLK. The master latch 243 shifts the output thereof based on the data input through the data input "D" during the low level of the clock signal CLK. The slave latch 244 stores therein data based on the potential of the output node of the master latch 243 at the rising edge of the clock signal CLK and delivers the stored data through the data output "Q".

The data input "D" of the D-FF in the memory 241 in FIG. 7 receives data from the external data line due to selection of one of the write ports WR_DATAJ even when the write operation is not needed. In this case, even if the clock gate 242 fixes the clock input "C" of the D-FF at a low level, the output node of the master latch 213 follows the data input through the external data line, although the data stored in the slave latch 244 does not shift due to the cut-off by the input transfer gate of the slave latch 244. More specifically, although the data stored in the D-FF does not shift, the output node of the master latch 213 shifts from "0" to "1" or "1" to "0" depending on the data input through the external data line, thereby wasting the electric power.

In summary, the conventional register file wastes operating current during input of the write data and output of the read data.

SUMMARY OF THE INVENTION

In view of the above problem in the conventional technique, it is an object of the present invention to provide a register file capable of reducing the power dissipation thereof and a method for designing such a register file.

The present invention provides, in a first aspect of thereof, a register file including: a plurality of input ports each for receiving therethrough a write data and having a priority order specified among the input ports; and a plurality of registers each for storing therein the write data based on a write address, each of the registers including an input port selector and a memory for storing an output from the input port selector, the input port selector including a combinational circuit including a plurality of AND gates each corresponding to one of the input ports and an OR gate for generating a logical sum of outputs from the AND gates, wherein each of the AND gates in one of the input port selectors receives a write instruction signal for specifying whether or not write data input through a corresponding one of the input ports is to be stored in a corresponding register, and generates a logical product of the write data and the write instruction signal and an inverted signal of each of the write instruction signals received through the input ports each having a higher priority order compared to the input port corresponding to the one of the input port selector.

In accordance of the register file of the first aspect of the present invention, the combinational circuit used instead of the master-slave latch in the conventional register saves the power dissipation.

More specifically, in the register file of the first aspect of the present invention, even if two or more write instruction signals assume an active high level in one of the registers, the output from the AND gate corresponding to the input port having a lower priority order assumes an inactive low level whereas the output from the AND gate corresponding to the input port having the highest priority order assumes the logical level of the write data. Thus, the OR gate, which generates a logical sum of the outputs from the AND gates in the register delivers the logical level of the data input through one of the input ports. On the other hand, if all the write instruction signals assume an inactive low level, i.e., if none of the data input through the input port is specified for storage in the register, then the output from the input port selector is fixed at a low level, whereby the memory has a lower power dissipation due to the input thereof being fixed at the lower level.

The present invention also provides, in a second aspect thereof, a register file including: a plurality of registers; a plurality of output ports each for delivering therethrough data stored in one of the registers specified by a read address; a plurality of read data selectors each corresponding to one of the output ports, each of the read data selectors including AND gates in number corresponding to the a number of registers and an OR gate generating a logical sum of outputs from the AND gates, each of the AND gates generating a logical product of data stored in a corresponding one of the registers and an activating signal which assumes a high level when the corresponding one the registers is specified.

The advantage of the second aspect of the present invention is similar to that described in connection with the first aspect of the present invention.

The present invention further provides a method for designing the register file according to the second aspect of the present invention, including the step of describing each of the read data selectors in a design description so that the each of the read data selectors is implemented by a combinational circuit including the AND gates and the OR gate.

The above and other objects, features and advantages of the present invention will be more apparent from the following description, referring to the accompanying drawings.

BRIEF DESCRIPTION OF THE DRAWINGS

FIG. 8 is an example of design description of the multiplexer used in the output port selector shown in FIG. 7.

FIG. 9 is a block diagram of the 2-input/1-output multiplexer stored in the cell library with a gate level notation.

FIG. 10 is a block diagram of the 4-input/1-output multiplexer including the multiplexers shown in FIG. 9.

PREFERRED EMBODIMENTS OF THE INVENTION

Figure 1:
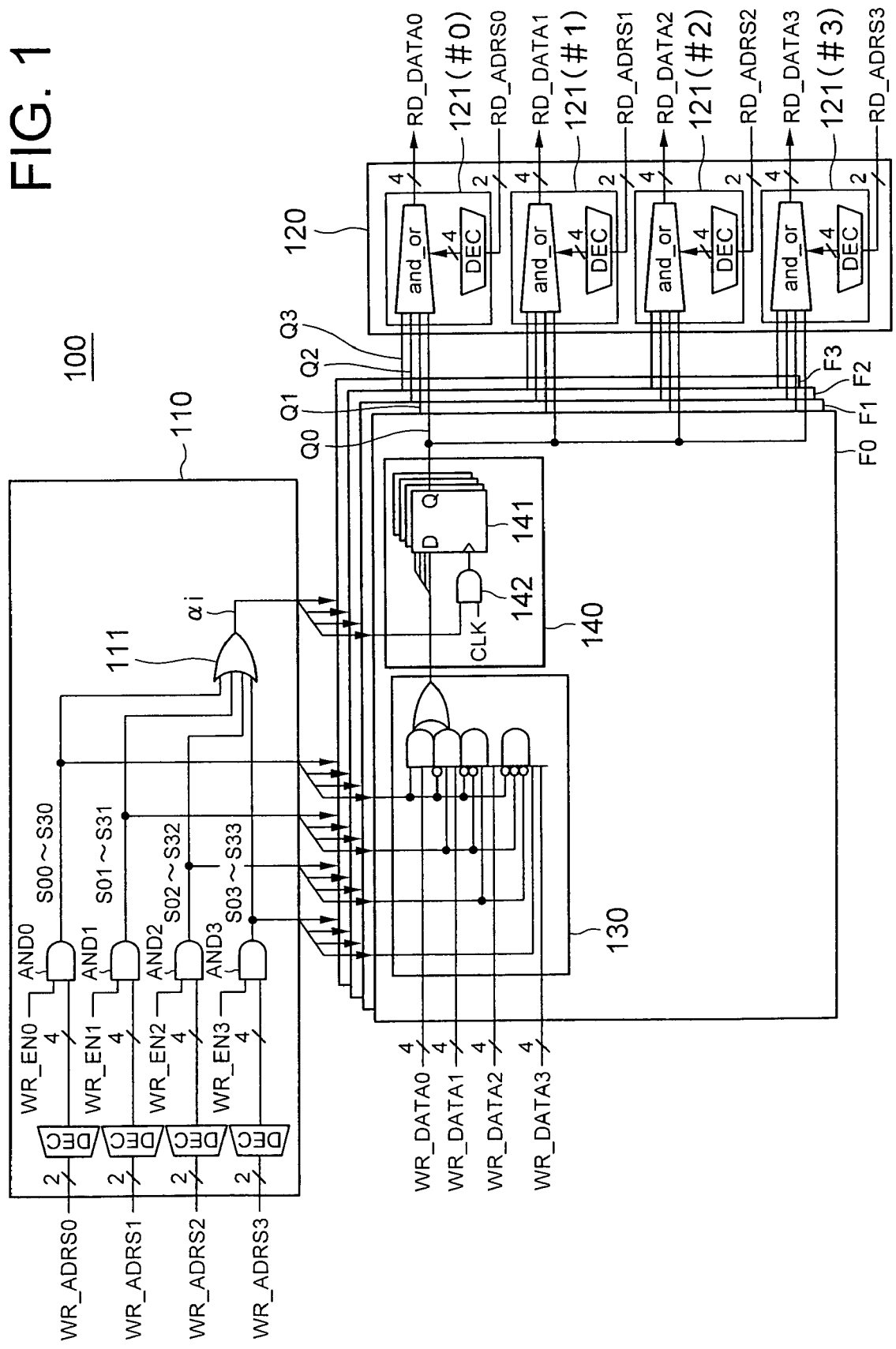
FIG. 1 is a block diagram of a register file according to an embodiment of the present invention.

Now, the present invention is more specifically described with reference to accompanying drawings, wherein similar constituent elements are designated by similar reference numerals or symbols.

Referring to FIG. 1, a register file, generally designated by numeral 100, includes therein 4-bit registers Fi (i=0 to 3), a selection signal generator 110, an output port selector block (or read data selector block) 120, four write ports WR_DATAJ (J=0 to 3), and four read ports RD_DATAk (k=0 to 3).

The selection signal generator 110 includes therein decoders DECj and AND circuits ANDj, which are respectively provided in number corresponding to the number of write ports WR_DATAj, and an activating signal generator 111. Each decoder DECj decodes the write address WR_ADRSj to generate an address signal having bits in number corresponding to the number of registers, wherein only one of the bits assumes "1", Each decoder DECj decodes a corresponding 2-bit write address signal WR_ADRS j, for example, address (01), to generate a 4-bit signal (0010) for selecting one of the registers Fi, i.e., register F1.

Figure 2:
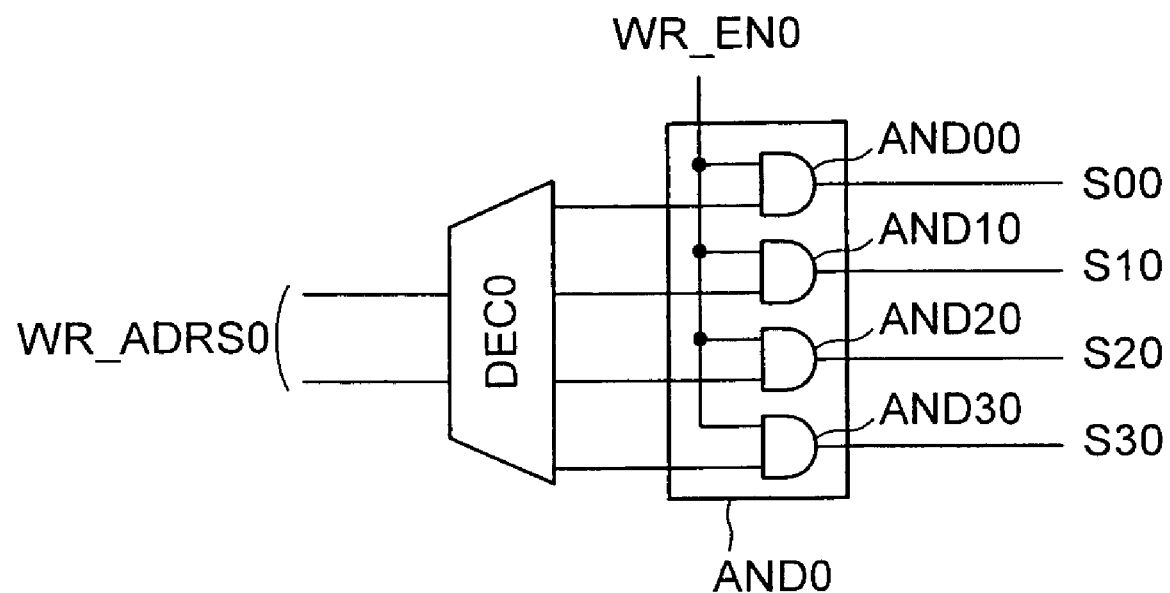
FIG. 2 is a block diagram of the selection signal generator shown in FIG. 1.

Referring to FIG. 2, there is shown a detail of part of the selection signal generator 110 shown in FIG. 1, including AND circuit AND0. Each AND circuit ANDj includes AND gates ANDij in number corresponding to the number of registers Fi, generates a logical product of each bit of the output from the decoder DECj and a write enable signal WR_ENj from the processor core, and delivers the logical product as a selection signal Sij to the registers F0 to F3. For example, assuming that outputs from the decoder DEC0 is (0,1,0,0) as viewed from AND00 to AND30, and that the write enable signal WR_EN0, which allows the data from output port WR_DATA0 to be stored in any of the registers Fi, is "1", then the AND circuit AND0 delivers selection signals Si0 wherein only the selection signal S10 to be delivered to the register F1 assumes "1", i.e., Si0=(0,1,0,0).

Back to FIG. 1, the activating signal generator 111 includes OR gates in number corresponding to the number of registers Fi, wherein each OR gate corresponding to one of the registers Fi generates a logical sum of the outputs, Sij, from the AND circuits AND0 to AND3 corresponding to the one of the registers Fi, and delivers the same as an activating signal αi to the one of the registers Fi selected by the write address signal WR_ADRSj. For example, if a data supplied through one of the write ports WR_DATAj is to be stored in the register F1, then the logical sum of S10 to S13 delivered from the AND circuits ANDj assumes "1", and thus the activating signal generator 111 delivers the logical sum as an activating signal αi to the register F1.

Figure 3:
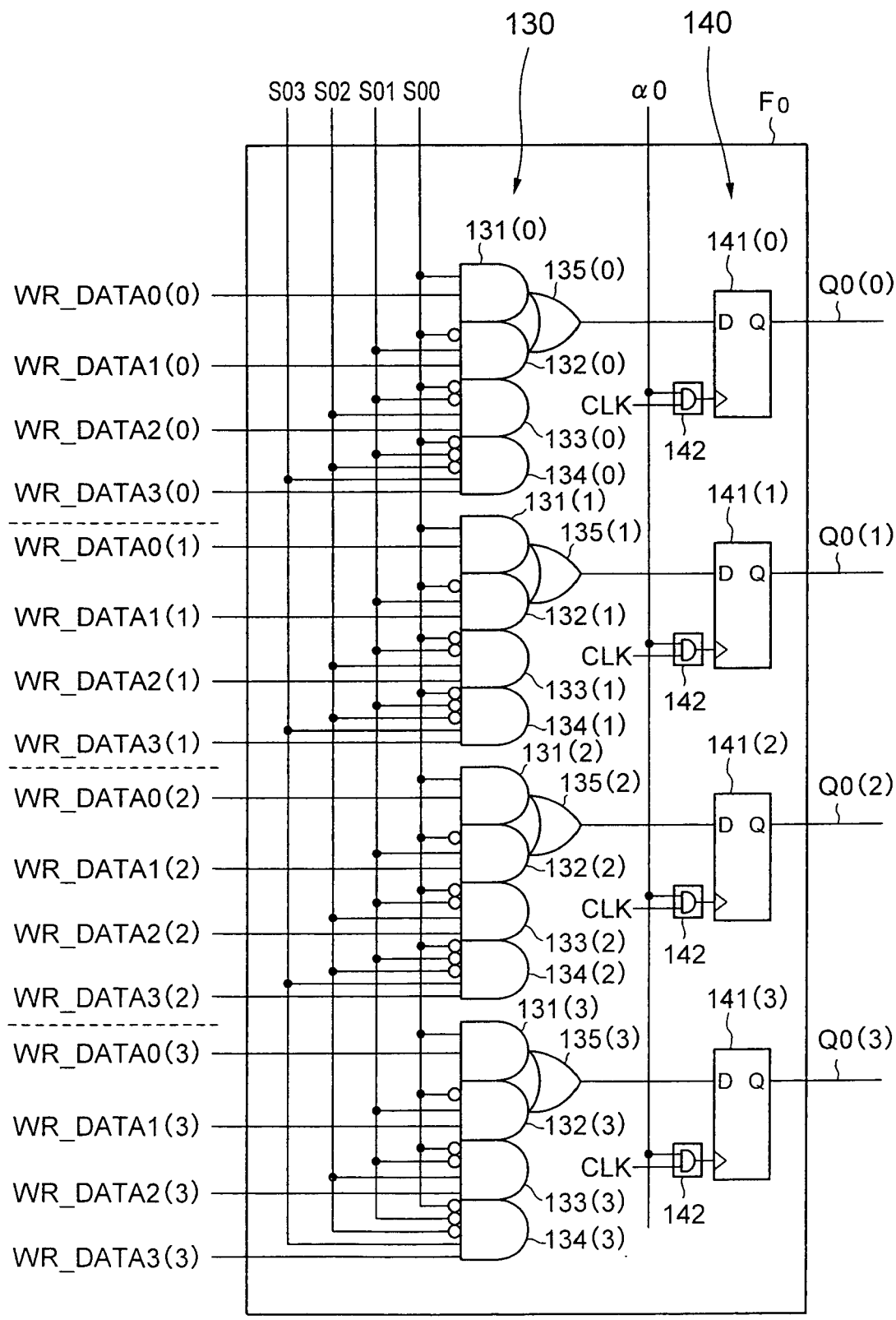
FIG. 3 is a block diagram of the register shown in FIG. 1.

Each register Fi includes an input port selector 130 and a data storage 140. Referring to FIG. 3, there is shown the detail of a configuration of the register F0. Other registers are similar to the register F0 shown therein. The input port selector 130 receives write data through the write ports WR_DATAj and stores the same in the data storage 140 based on the selection signal Sij supplied from the selection signal generator 110. The data storage 140 includes memory memories 141 in number corresponding to the number of bits to be stored and corresponding clock gates 142, and delivers data Qi. The number between the parentheses in FIG. 3 shows the sequential order of the bits of the write data.

The input port selector 130 includes, for each bit of the write data, AND gates 131 to 134 and an OR gate 135. Each AND gate 131 generates a logical sum of the selection signal S00 and a corresponding bit of the write data supplied through the write port WR_DATA0. Each AND gate 132 generates a logical sum of the inverted signal of the selection signal S00, selection signal S01 and a corresponding bit of the write data supplied through the write port WR_DATA1. Each AND gate 133 generates a logical sum of the inverted signal of the selection signal S00, inverted signal of the selection signal S01, the selection signal S02, and a corresponding bit of the write data supplied through the write port WR_DATA2. Each AND gate 134 generates a logical sum of the inverted signal of the selection signal S00, inverted signal of the selection signal S01, inverted signal of the selection signal S02, the selection signal S03 and a corresponding bit of the write data supplied through the write port WR_DATA3. Each OR gate 135 generates a logical sum of the outputs from the AND gates 131 to 134 to deliver the same to the data storage 140.

Figure 7:
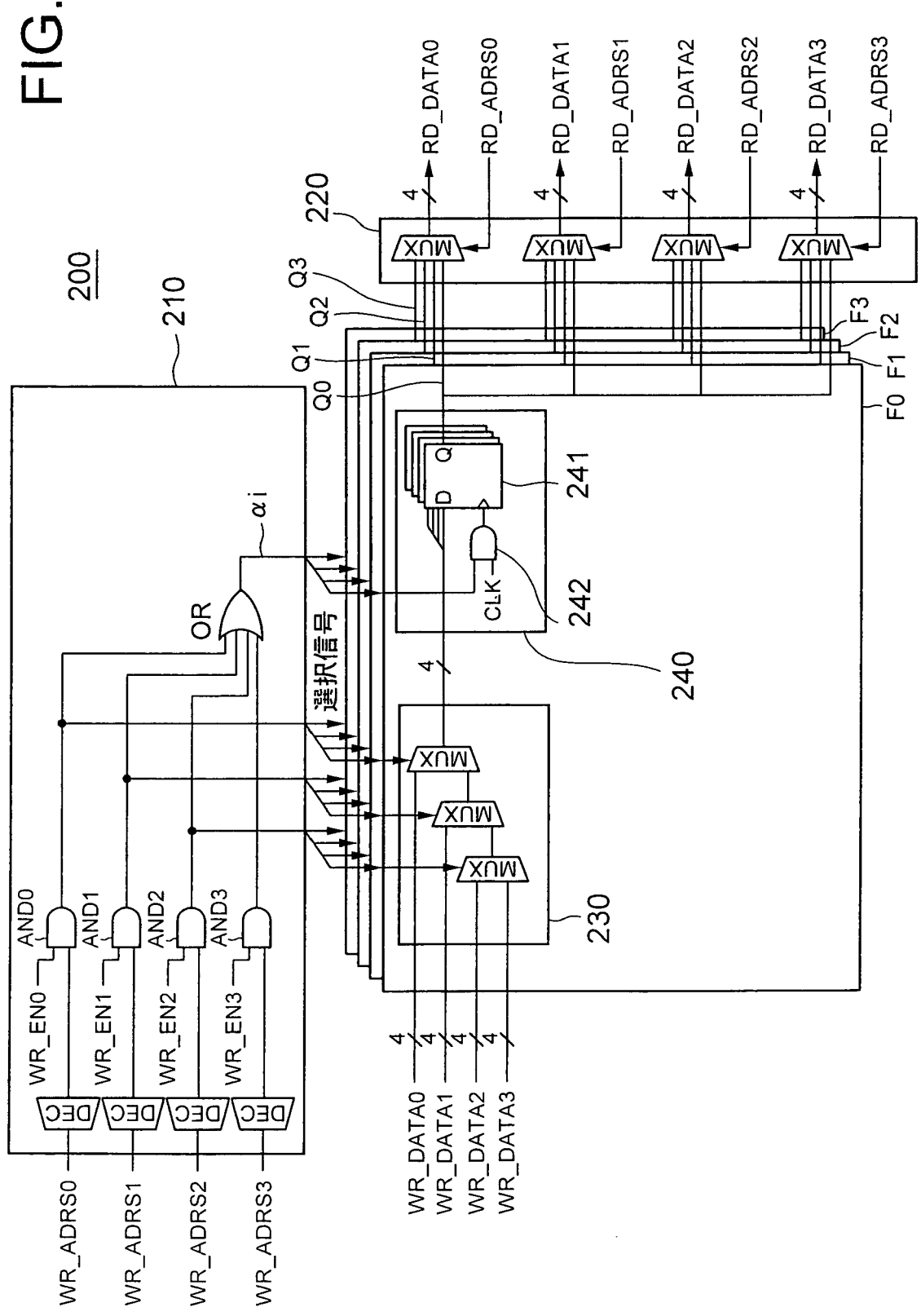
FIG. 7 is a block diagram of a conventional register file.
Figure 11:
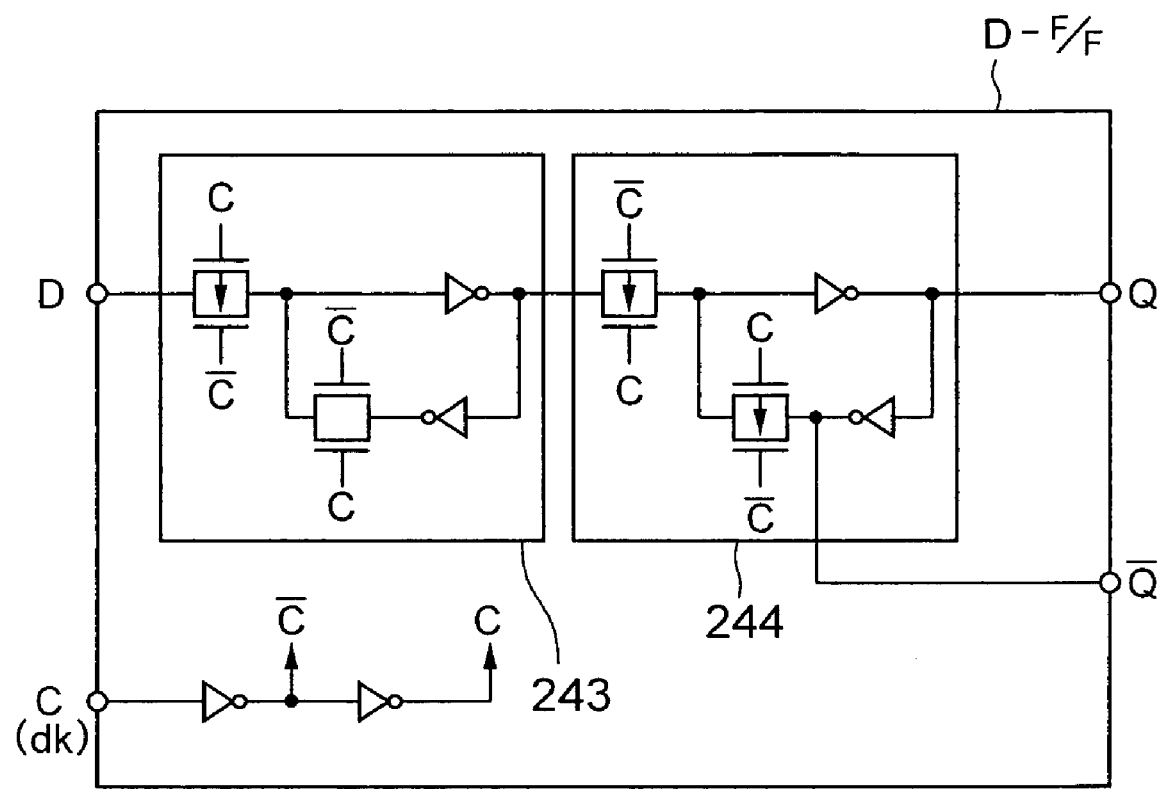
FIG. 11 is a circuit diagram of a synchronous D-FF employed in the memory of the conventional register file.

The input port selector 130 is implemented by a selector having a priority order among the input port selectors 130, similarly to the input/output port selector 230 in the conventional register file 200 shown in FIG. 7. For example, if the selection signal S00 assumes a high level, data from the write port WR_DATA0 is delivered via the OR gate 135 to the data storage 140 due to the output from the AND gates 132 to 134 being fixed at a low level. In addition, even if the selection signal S03 assumes a high level, since the AND gate 134 receives the inverted signals of the selection signals S00 to S02, data from the write ports WR_DATA 3 is not delivered to the data storage 140 so long as data from the write ports WR_DATA0 to WR_DATA2 are specified.

The memory 141 includes synchronous D-FFs in number corresponding to the number of bits of data to be stored in the register Fi. Each D-FF receives and stores data from the write port WR_DATAj in a bit-by-bit basis, in synchrony with the clock signal CLK supplied through the clock gate 142.

Figure 4A:
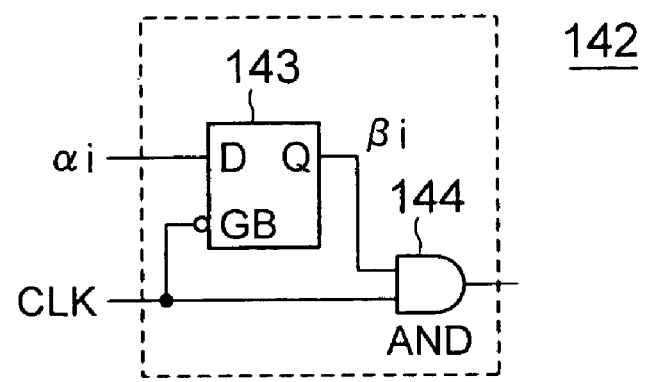
FIG. 4A is a block diagram of the clock gate shown in FIG. 3.
Figure 4B:
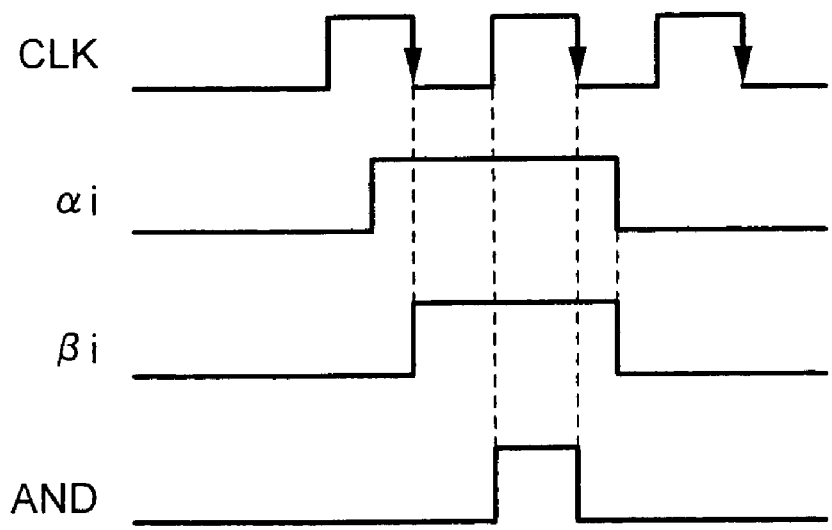
FIG. 4B is a timing chart of the signals in the clock gate of FIG. 4A.

Referring to FIG. 4A, the clock gate 142 shown in FIG. 3 includes a latch circuit 143 and an AND gate 144. FIG. 4B shows the timing chart of the clock gate 142 of FIG. 4A. The latch circuit 143 latches the activating signal αi at the falling edge of the clock signal CLK, as shown in FIG. 4B, to deliver the latched activating signal βi. The AND gate 144 generates a logical product of the clock signal CLK and the latched activating signal βi, whereby the clock gate 142 delivers the clock signal CLK to the corresponding memory 141 during the high level of the latched activating signal βi.

In the register F0, for example, if any of the selection signals S0j assumes a high level, then the activating signal αassumes a high level, whereby each D-FF of the memory 141 effectively receives the clock signal CLK at the clock input thereof. At this stage, the input port selector 130 receives at the data input thereof data from the write port WR_DATAJ specified. On the other hand, if all the selection signals S0j assume a low level, then the clock input and the data input of each D-FF are fixed at a low level, whereby the data stored in each D-FF is not updated.

Back to FIG. 1, the output port selector block (read data selector block) 120 includes therein selectors 121 in number corresponding to the number of the read ports RD_DATAk, and has a function similar to the function of the output port selector 220 in the conventional register file 200 shown in FIG. 7. Each selector 121 receives data Qi stored in the register Fi, similarly to the multiplexer MUX in the output port selector 220, to select data Qi to be read out through the read port RD_DATAk based on the read address RD_ADRSk.

Figures 5, 6:
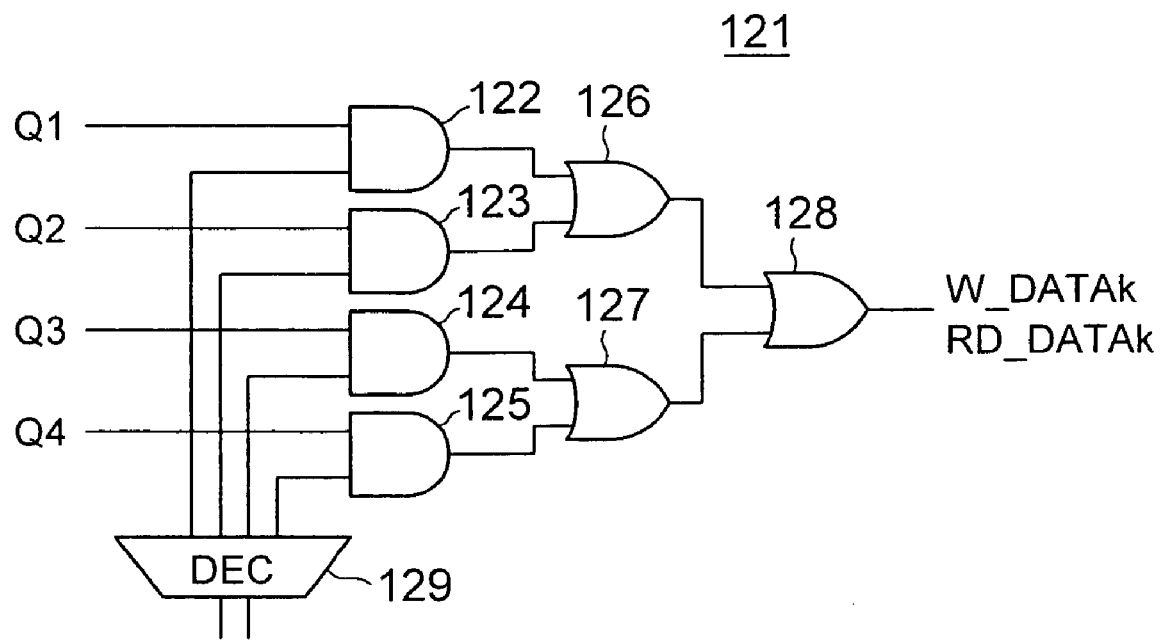
FIG. 5 is a block diagram of the selector shown in FIG. 1.
FIG. 6 is an example of the description in HDL for the selector of FIG. 5.

Referring to FIG. 5, each selector 121 includes therein AND gates 122 to 125 in number corresponding to the number of bits of data to be stored in the register Fi, corresponding OR gates 126 to 128 and a decoder 129. The decoder 129 generates an activating signal which activates one of the output signal lines corresponding to the registers Fi based on the read address RD_ADRSk, thereby selecting one of the registers Fi from which the read port RD_ADRSk is to read the data. If the 2-bit address specifies (01), for example, the decoder delivers a 4-bit signal (0010) for selecting one of the registers Fi, i.e., F1.

Each of the AND gates 122 to 125 generates a logical product of the data Qi from the register Fi and the output from the corresponding decoder 129 to deliver the same to the OR gate 126 or 127. Since only one of the signals delivered from the decoders 129 assumes a high level, the outputs of the AND gates 122 to 125 are fixed at a low level except the AND gate receiving the high level. The first-stage OR gates 126 and 127 generate a logical product of outputs from the AND gates 122 and 123 and a logical product of outputs from the AND gates 124 and 125, respectively, and the second-stage OR gate 128 generates a logical product of outputs from the OR gates 126 and 127.

Assuming that the zero-th bits of the data Q0 to Q3 are (0,1,0,1) as viewed from data Q0 to data Q3 in the registers F0 to F3, for example, and that the read address RD_ADRS0 is (000), the AND gate 122 receives a high-level data from the decoder 129 in the selector 121 corresponding to the read port RA_DATA0. However, since data Q0(0) assumes "0" or a low level, all the outputs from the AND gates 122 to 125 assume "0", whereby the read port RD_DATA0 delivers therethrough "0" of data Q0(0). If the read address RD_ADRS0 shifts from (00) to (11) at this stage, the decoder 129 delivers a high-level signal to the AND gate 125, the output from the AND gate 125 as well as the outputs from the OR gates 127 and 128 shifts from "0" to "1", whereby the read port RD_DATA0 delivers therethrough "1" as data Q3(0).

FIG. 6 exemplifies design description of the selector 121. This description describes the function of the selector 121 by using a logical sum and a logical product, which is different from the multiplexer in the conventional description (in FIG. 8) using a case sentence. In FIG. 6, "&" corresponds to a logical product which is to be implemented by hardware, whereas "|" corresponds to a logical sum which is to be implemented by hardware. In the present embodiment, the selector 121 is described by combination of the logic gates so that the function of the multiplexer is not implemented by using the primitive cells prepared in the cell library for a multiplexer. Accordingly, the gate level circuit for the selector 121 is configured by the combination of the logic gates, such as AND or OR gates without depending on the tool for the logical synthesis and the cell library used in the design.

Although the selector 121 used in the present embodiment includes an additional decoder 129, as described above, which consumes some amount of current upon a change of the read address RD_ADRSk, the single decoder 129 can be used in common for all the bits of data Qi in the register Fi, whereby both the circuit scale and the operating current of the decoder 129 remain within a moderate increase.

More specifically, the increase of the operating current due to the provision of the decoder 129 is significantly lower compared to the dissipated current of the multiplexer in the conventional register file shown in FIG. 9, which wastes the electric power upon the change of the multiplexer. In the present embodiment, since the outputs from the AND gates 122 to 125 which receive non-selection data do not dissipate the operating current, whereby the current dissipation is reduced in the present embodiment.

In the register file designed by the method of the present embodiment, as described above, the input port selector 30 having a priority order is configured by a combinational circuit including AND gates and OR gates. Thus, the input port selector 130 allows the input of the memory 141 to be fixed at a low level when the write data is not to be stored in the memory 141. This prevents operation of the master latch in the D-FF of the data storage to thereby save the power dissipation as encountered in the data storage of the conventional register file.

In the design of the selector 121, as described above, the function of the selector 121 is described by the combination of the AND gates and OR gates so as not to use the primitive cells for a multiplexer stored in the library cell. This allows the gate-level circuit configuration of the selector 121 to be implemented by the combinational circuit without depending on the tool for the logical synthesis or cell library. The principle of the design method of the present invention should be also applied to the design of the input port selector 130 in each register Fi.

It is to be noted that the number of registers, bit length of the data stored in the registers, number of write ports, number of read ports etc. employed in the present embodiment are mere examples, and these numbers etc. may be selected depending on the specification of the semiconductor device to be designed. In such a case, the write address and read address have bit lengths determined based on the number of ports.

Since the above embodiments are described only for examples, the present invention is not limited to the above embodiments and various modifications or alterations can be easily made therefrom by those skilled in the art without departing from the scope of the present invention.

What is claimed is:

1. A register file comprising:
a plurality of input ports each for receiving therethrough a write data and having a priority order specified among said input ports; and
a plurality of registers each for storing therein said write data based on a write address, each of said registers including an input port selector and a data storage for storing an output from said input port selector, said input port selector including a combinational circuit including a plurality of first AND gates each corresponding to one of said input ports and a first OR gate for generating a logical sum of outputs from said first AND gates, wherein:
each of said first AND gates in one of said input port selector receives a write instruction signal for specifying whether or not write data input through a corresponding one of said input ports is to be stored in a corresponding one of said registers, and generates a logical product of said write data and said write instruction signal and an inverted signal of each of said write instruction signals received through said input ports each having a higher priority order compared to said input port corresponding to said one of said input port selector.

2. The register file according to claim 1, further comprising a plurality of output ports and a plurality of output port selectors each for corresponding to one of said output ports, wherein each of output port selectors includes second AND gates each disposed corresponding to one of said registers for generating a logical product of data stored in a corresponding one of said registers and an activating signal assuming a high level upon selection of said corresponding one of said register and a second OR gate generating a logical sum of outputs from said first AND gates.

3. The register file according to claim 1, wherein said data storage includes a synchronous D-FF including a master latch for latching an output from said first OR gate, and a slave latch for receiving data from said master latch.

4. The register file according to claim 1, wherein said write instruction signal is generated by a logical product of a decoded signal decoded from said write address to have bits in number corresponding to the number of said registers and a write enable signal specifying whether or not each of said input ports is allowed to write data.

* * * * *